Nov. 1, 1960 J. O. EWING 2,958,206
COMBINATION EVAPORATOR-CONDENSER PLATE ASSEMBLY
Filed Dec. 13, 1956 4 Sheets-Sheet 1
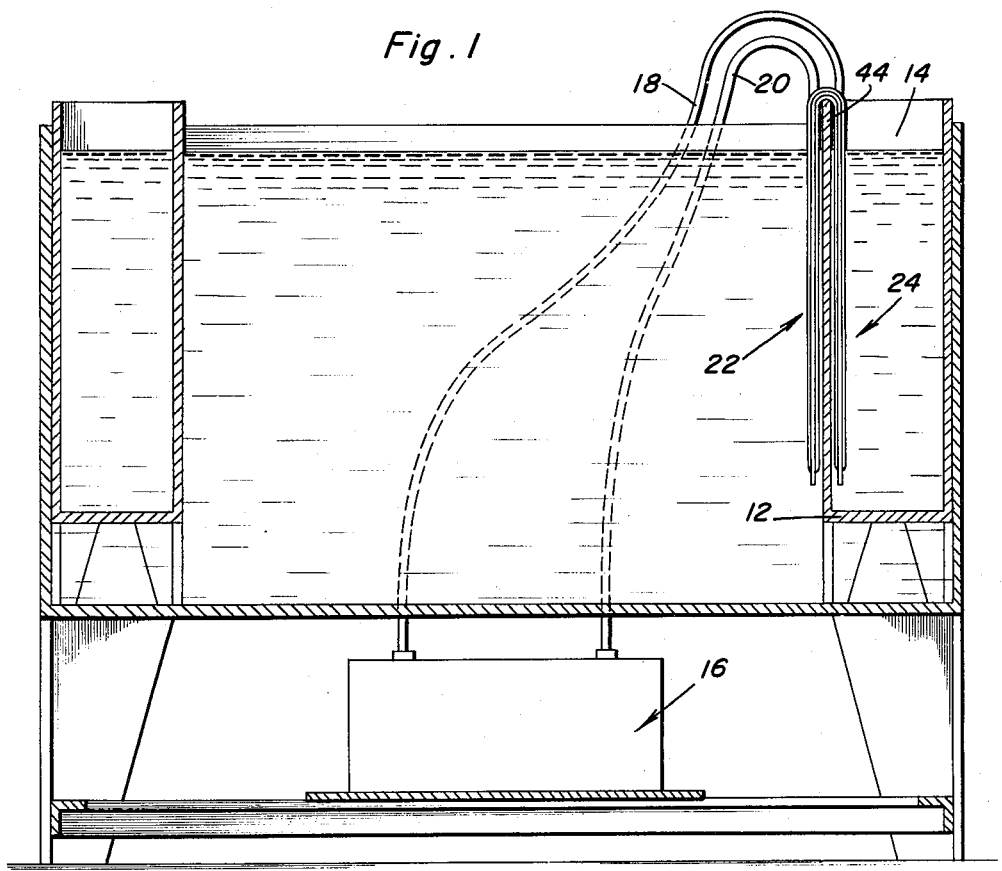
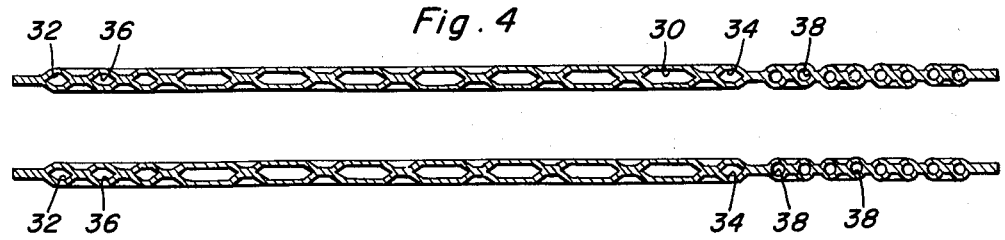
James O. Ewing
INVENTOR.

Nov. 1, 1960     J. O. EWING     2,958,206
COMBINATION EVAPORATOR-CONDENSER PLATE ASSEMBLY
Filed Dec. 13, 1956     4 Sheets-Sheet 2
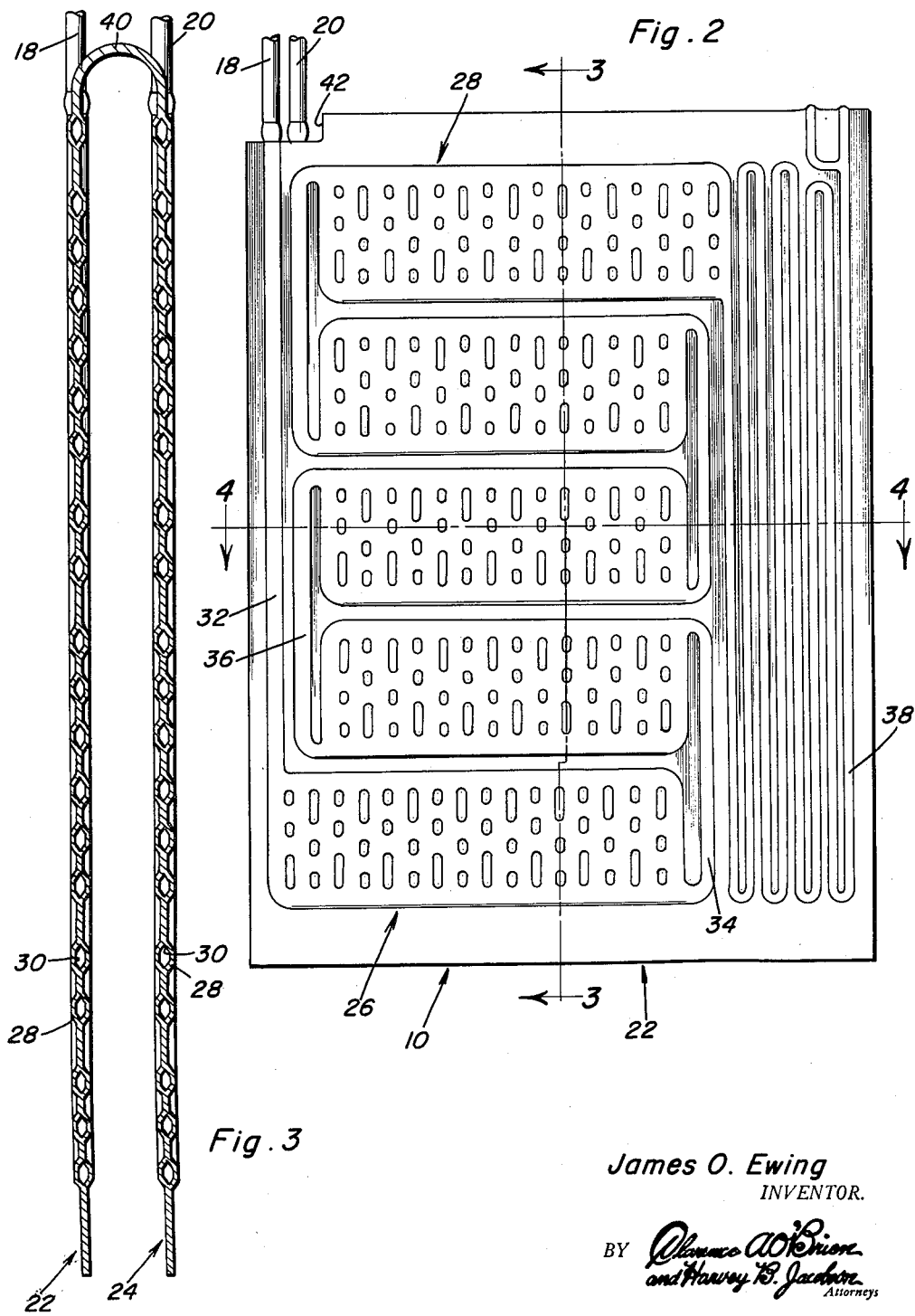
James O. Ewing
INVENTOR.

Nov. 1, 1960  J. O. EWING  2,958,206
COMBINATION EVAPORATOR-CONDENSER PLATE ASSEMBLY
Filed Dec. 13, 1956  4 Sheets-Sheet 3
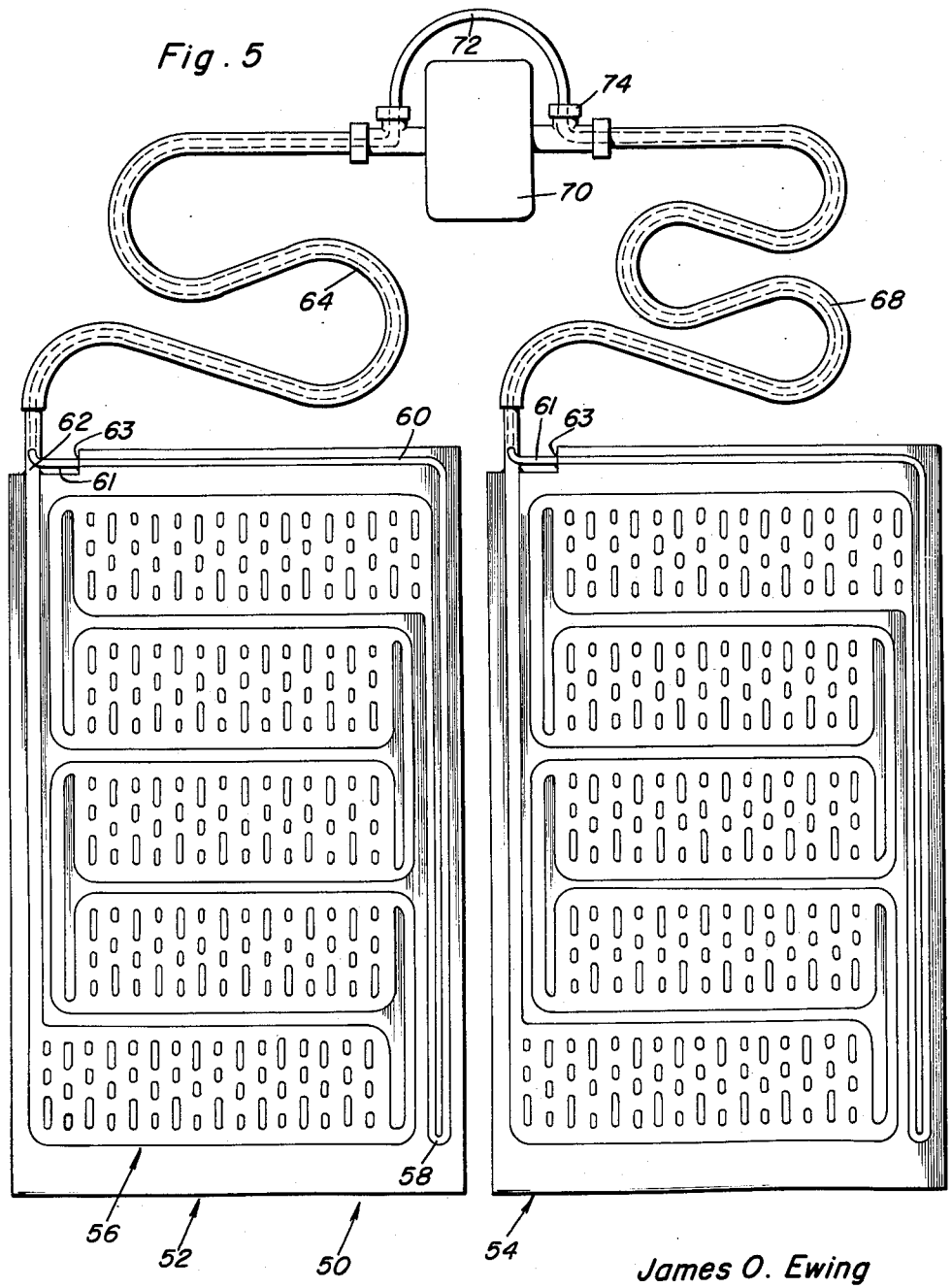
James O. Ewing
INVENTOR.

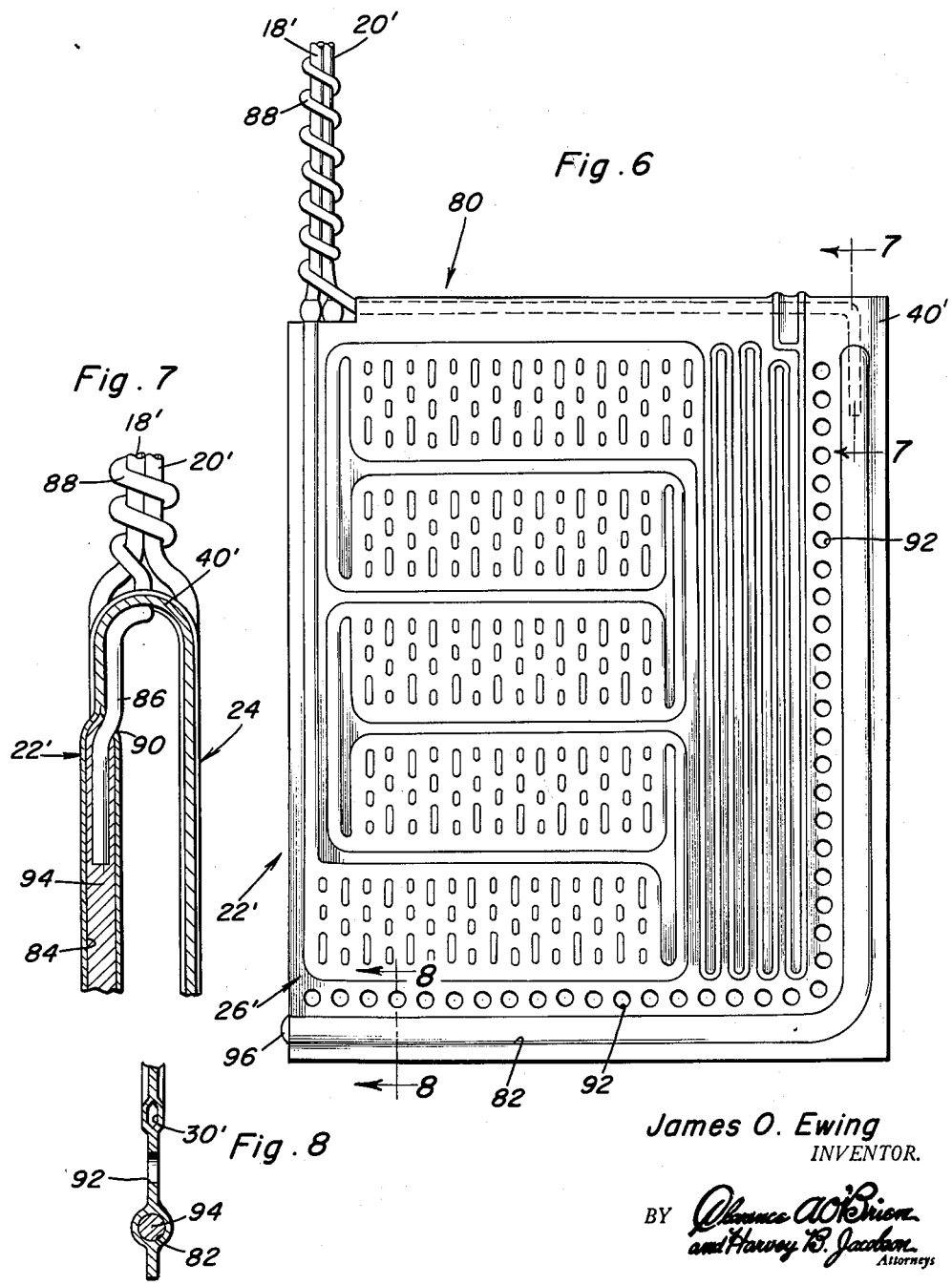

United States Patent Office 2,958,206
Patented Nov. 1, 1960

2,958,206

COMBINATION EVAPORATOR-CONDENSER PLATE ASSEMBLY

James O. Ewing, 4507 Belmont Park Place, Nashville, Tenn.

Filed Dec. 13, 1956, Ser. No. 628,101

9 Claims. (Cl. 62—160)

The present invention generally relates to a novel concept in the construction of an evaporator-condenser plate assembly and more particularly is an improvement of the invention disclosed and claimed in my co-pending application Serial No. 569,527 for Temperature Control System for Solution Tanks, filed March 5, 1956, now Patent No. 2,910,838.

In the temperature control device set forth in detail in my co-pending application the arrangement of the combination evaporator-condenser plate effectively controlled the temperature of the solution, the problem arose of temperature stratification or temperature differential between the upper surface of the liquid solution and the lower surface thereof. Accordingly, it is one of the primary objects of the present invention to provide a segmented evaporator-condenser plate which will induce convection currents in the solutions being heated or chilled thus avoiding stratification of temperatures in the solutions.

In carrying out this object, the segmented plate is of a "fish-ladder" arrangement so that when the plate is chilling, the top segment chills first, the next lower segment chills second and so on down the plate with the refrigerant losing its refrigerating effect step-by-step until the refrigerant is almost evaporated or dried out in the bottom or last segment thus having the greatest refrigerating effect at the top of the solution and the lowest refrigerating effect at the bottom of the solution thus inducing convection currents and a resultant stirring action for eliminating temperature stratification of the solution. When the plate is being employed in heating, the highest heat is caused to be developed in the bottom segment due to the hot gas entering from the compressor in the bottom segment first and thus losing most of its heat in the bottom segment and so on to the next above segments until the top segment is only slightly warmer than the solution bath in which the plate is immersed. This also will induce convection currents for stirring the solution and for eliminating temperature stratification therein for providing a constant temperature control with the solution being substantially the same temperature throughout.

Another important object of the present invention is to provide an evaporator-condenser plate assembly wherein the evaporator plate may be in one tank or area while the condenser plate (or vice versa) may be remote therefrom in another tank or area.

A still further very important object of the present invention is to provide an evaporator-condenser plate assembly having another unique feature in the built-in thermostatic heat sensing bulb which effectively solves the need for a simple yet accurate means of registering the mean temperature of the vat or tank which was being chilled or heated by the evaporator-condenser plate of the inverted U-shaped assembly.

In an attempt to insert into the solution in the tank or vat existing thermal bulbs available from various commercial sources, it was found that such bulbs were cumbersome and robbed useful film space from the vat thus interfering with the film hangers in inserting or removing films in the course of work in film processing or the development thereof. Additionally, an unsatisfactory condition existed in that the usual bulbs did not register an average temperature from top to bottom of the vat. Several reasons for the failure of the gas filled sensing elements clearly show that a narrow plateau of actual heat responsiveness was obtained. In other words, only two or three inches of the heat sensing bulb even though the bulb itself was twelve to fourteen inches long and was mounted vertically in the vat was effective for responding to the heat of the solution in the vat. Inasmuch as the bulb had to be constructed in all cases from type No. 316 stainless steel to combat corrosion in photo alkaline and acidic solutions and since the heat conducting characteristics of stainless steel is about one-tenth that of copper, any temperature change in the solutions would not cause the vapor pressure in the bulb to change except when the heat was changed on the bottom section of the bulb. Inasmuch as the bulb was elongated and disposed vertically, the bottom section of the bulb contains the condensed liquid from the original charge when manufactured. The rest of the bulb, being filled with vapor, had but little effect on the internal pressure when only the vapor filled section was heated or cooled; hence little or no action resulted on the actuating syphon mounted on the opposite end of the connecting capillary tube thereby resulting in poor mean temperature regulation or responsiveness. In the case of copper bulbs in non-corrosive solution applications, the vapor area of the bulb was quite sensitive, however, owing to the high heat conducting characteristics of the copper bulb, the heat of the solution was transferred through the copper bulb into the liquid filled region so that any heat change sensed at any point along the entire shaft of the bulb would reach the liquid filled region thus providing an accurate means of temperature determination.

Since X-ray and photo chemicals are highly corrosive the present invention must be made from type 316 stainless steel to withstand these chemicals. In solving the problem of the responsive heat bulb to the mean temperature of the solution in the vat throughout the vertical height thereof and not just a narrow horizontal cross-section of the solution, it was discovered that by filling the bulb with a neutral absorptive material such as cotton or asbestos then injecting the condensible gas (iso-butane) into the bulb in a liquid form until the cotton or asbestos had soaked up all it could, this saturated suspension placed raw unvaporized liquid in contact with the full length of the thermal bulb and provided full length bulb response even though it was of type 316 stainless steel and was immersed in stratified levels of solution temperature. This construction gives a mean vapor pressure with respect to all levels of temperature encountered from the top to the bottom of the vat thereby providing a more sensitive bulb and has more heat absorptive liquid surface exposed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a general sectional view of a solution vat or tank having the present invention installed therein;

Figure 2 is an elevational view of one side of the combined evaporator-condenser plate assembly of the present invention;

Figure 3 is a vertical sectional view taken substantially upon a plane passing along section line 3—3 of Figure 2 illustrating the details of construction of the assembly of the present invention;

Figure 4 is a transverse, plan sectional view taken substantially upon a plane passing along section line 4—4 of Figure 2 illustrating further structural details of the assembly;

Figure 5 is a schematic illustration of a modified form of the invention with the plate members or panels being disposed remotely;

Figure 6 is an elevational view of a further modified form of the invention having a built-in heat sensing bulb of a novel construction;

Figure 7 is a detailed sectional view taken substantially upon a plane passing along section line 7—7 of Figure 6 illustrating the details of construction of the heat sensing bulb and the capillary tube connected thereto; and Figure 8 is a detailed sectional view taken substantially upon a plane passing along section line 8—8 of Figure 6 illustrating further structural details of the built-in heat sensing bulb.

Referring now specifically to Figures 1–4 of the drawings, the numeral 10 generally designates the evaporator-condenser plate assembly of the present invention which is incorporated in a temperature solution tank or vat generally designated by the numeral 12 having a solution 14 of liquid disposed therein in which it is desired to control the temperature thereof and maintain a predetermined temperature. The same general combination of elements is employed in the present instance as in my co-pending application, Serial No. 569,527, now Patent No. 2,910,838, in that a reversible compressor assembly is generally designated by the numeral 16 for alternately changing the conduits 18 and 20 from suction to discharge lines and alternately changing the panels generally designated by the numerals 22 and 24 which make up the plate assembly and the evaporator panels or condenser panels.

Each of the panels includes a series of vertically arranged segments generally designated by numeral 26 with each of the segments being defined by spaced wall areas 28 defining horizontal passages 30. An elongated vertical passageway 32 extends along one edge of each of the panels 22 and 24 and is connected to a conduit 18 or 20 at the upper end thereof. This elongated vertical passageway 32 extends into the lowermost segment 26 and is in communication with the transverse passageways formed thereby. The bottom corner of the segment 26 is provided with an upwardly extending passageway 34 which extends into the top corner of the next vertically disposed segment 26. The segments 26 are substantially identical in construction and provide vertically transverse or horizontal passageways. The lower corner of the second segment 26 is communicated through vertical passageway 36 with the upper corner of the next adjacent vertically disposed segment 26. There are five vertically disposed segments illustrated with the bottom corner of the lower sections being connected to the upper corner of the next upper section. The uppermost section 26 has the lower corner thereof communicated with an elongated vertical passageway 38 which extends towards the bottom of the panel and is reversely curved thus providing a series of restricted passageways which act as a capillary tube and which extend over the bight portion 40 of the assembly 10 and communicate with the segments on the other panel which is identical in construction whereby the capillary passageway 38 is connected to the uppermost segment 26 on the other panel. It is pointed out that the panels 22 and 24 are identical in construction and the same reference numerals are employed to designate the same structural elements and the vertical passageways 32 are communicated with the conduits 18 and 20 by any suitable fitting with these connecting points being disposed in a cutaway portion 42 of the bight portion 40 thus providing a compact inverted U-shaped plate assembly which may be disposed in supporting relation on a partition wall 44 of the tank 12. For convenience of designation, the panel shown in elevation in Figure 2 may be considered panel 22 as illustrated in Figure 1. When the panel or plate 22 is used for chilling or cooling, the refrigerant is received from the condenser plate 24 through the capillary passageway 38. The upper segment 26 will chill first inasmuch as the capillary passageway 38 is connected directly thereto. The refrigerant will spill over the top corner of the upper segment and then downwardly into the next lower segment and thus on down in a step-by-step manner while losing its refrigerating effect until the refrigerant is substantially completely evaporated in the bottom segment 26 after which it is discharged vertically through the passageway 32 back to the reversible compressor 16. When the cycle is reversed and the panel 22 is used for heating, the hot refrigerant and compressed gases are received from the reversible compressor 16 into the vertical passageway 32 and initially into the bottom segment 26 of the panel 22. This causes the highest heat loss in the bottom segment and a step-by-step reduction in the heat loss of the refrigerant as it progresses to the top segment 26 and then out through the capillary passageway 38 to the panel 20 which will then act as a cooling or chilling panel.

In practical operation, the device as illustrated has reduced the temperature of five gallons of solution from 93° F. to 68° F. an average of one degree per minute. The device will be constructed of type #316 stainless steel which is a commercially available product and the arrangement of the segments induces a convection stirring action which substantially eliminates any stratification of temperature in the solution.

A model of the particular construction has been constructed employing the "Roll-Bond" process by Olin Mathieson Chemical Corporation, East Alton, Illinois, which briefly incorporates the steps of providing two plates with certain areas thereof being coated or treated in such a manner to prevent bonding. These plates are then cold rolled under predetermined pressures so that the metal of the plates in the untreated areas will actually bond together and become as one-piece after which the treated areas may be expanded by hydraulic pressure or other pressure means thus providing expanded passageways such as the passageways 30, 32 and 38. The built-in capillary passageway together with the built-in segmental step-by-step heat exchange construction provides a compact temperature control device which does not take up any appreciable area of the tank or vat thus permitting a maximum number of films to be processed or developed without interference from the temperature control device.

Referring now specifically to Figure 5 of the drawings, a modified form of the present invention is designated generally by the numeral which includes a panel 52 and 54 which are completely separate from each other so that one panel may be positioned several feet or remote from the other panel thus permitting flexibility in the installation of the assembly of the present invention. In this instance, the panels 52 and 54 are identical and include heat exchange segments 56 arranged in vertically spaced relation and interconnected in the same manner as the panels in the construction of Figures 1–4. A capillary passageway 58 is provided which extends upwardly along one edge of each of the panels and then extends transversely horizontally at the top edge thereof as designated by the numeral 60. The free end of the capillary passageway 60 is connected to capillary tube 61 by welding 63 then extends through the upper end of the tubular member 62, which is also connected by welding or the like, and is disposed concentric therewith and extends concentrically in the fluid conduits 64 and 68 which are connected to the reversible compressor assembly 70. A bridging portion of the capillary tube 61 is designated by the numeral 72 which extends outwardly through adapter 74 for extending past the compressor assembly 70 thus communicating the capillary passageway of one panel with the capillary passageway of the other panel and disposing the capillary tube concentrically in the conduits 64 and 68. The area between the conduits 64 and 68 and the capillary tubing will provide space for the refrigerant such as "Freon 12." If the panel 52 is acting as a condenser, the hot gas will heat the lower segment 56 first and will proceed with a step-by-step reduction in the heat loss to the heat absorbing medium and the condensed refrigerant will pass through the conduit 64 and then into the conduit 68 and be discharged into the upper segment 56 of the panel 54 which will then act as an evaporator and of course the evaporated gas will return through the conduit 68.

Referring specifically to Figures 6–8 of the drawings, the numeral 80 generally designates another modified form of the present invention which is closest to that form illustrated in Figures 1–4. In fact, the identical segmental heat exchange areas are employed as is the identical capillary passageway and the same reference numerals are applied thereto with the reference numerals being primed for differentiation.

This form of the invention differs from that illustrated in Figures 1–4 by the provision of a built-in heat sensing bulb which is in the form of an elongated horizontally disposed passageway 82 extending under the lowermost segment 26' and then extending upwardly in a vertical tubular portion 84 towards the bight portion 40' with the capillary tube 86 extending into the top end of the vertical portion and extending horizontally under the bight portion 40' and then enclosing the tubular conduits 18' and 20' by encircling the same in a spiral manner as designated by the numeral 88. This spiral portion 88 acts for providing flexibility as a spring in order to keep the hose lines or conduits 18' and 20' together and to prevent kinking thereof. The capillary tube 86 extends into the dead-end of the inflated or expanded passageway 84 through a drilled aperture 90 on the inside face of the plate to protect the capillary tube from outer vat area and also to prevent catching on hangers, etc. A plurality of spaced apertures 92 are provided inwardly of the vertical and horizontal passageways 84 and 82, thus removing substantially two-thirds of the metal of the plate to reduce plate interference on the bulb by conduction of heat from the plate to the tube. The passageways 82 and 84 are completely filled with absorptive material, such as cotton or asbestos, designated by numeral 94 which is in the form of wadding for saturation with iso-butane liquid. The filling end of the passageway 82 may be closed by a seal 96 to prevent leakage of the heat sensitive liquid which is vaporized in response to increases in temperature and condensed in response to decreases in temperature with the variation in pressure accurately determining the mean temperature of the material in the vat. In the event, it is desired that the heat bulb be to the right instead of to the left for variation in installations, the plate assembly may be reversely bent or doubled by the manufacturer so that the built-in bulb may be either to the left or right to suit the individual installation.

As discussed previously, the provision of the built-in heat sensitive bulb having the saturated suspension of the unvaporized liquid in contact with the full length of the thermal bulb also eliminated the danger common to all gas filled bulbs of accidentally getting liquid into the capillary tube or worse yet in the bellows. The present conventional construction attempts to avert this danger by inserting the capillary tube into the bulb chamber to a point about half way up the bulb's length and a centering spacer is mounted on the end of the capillary tube to preclude the tip from dipping into the liquid charge as it goes from one end to the other when handled or tilted. In the cotton or other absorptive material filled chamber of the bulb in the plate of the present invention the capillary tube is inserted to about one-sixth of the plate or bulb's length to trap any droplets of unabsorbed liquid in case over saturation might occur.

In connection with the form of the invention illustrated in Figure 5, the free end of the capillary tube 61 may be wrapped around the outside of the tubular member 62 if appearance or neatness is discarded in favor of a more efficient capillary system when lesser heat from the hot condensate will be absorbed by the liquid refrigerant in the capillary tubing 61 entering the evaporator plate. This is accomplished by wrapping the capillary tubing 61 around the outside of the neoprene hose substantially as shown in Figure 7. In the case where the capillary tubing is wrapped around the outside of the flexible hoses or conduits 64 and 68 generally in nature of a spiral, the capillary tubing may be either nylon or metallic since the insulating effect of the hose carrying the hot gas will interfere with the liquid refrigerant passing through the capillary tubing. The spiral wrapping on the hoses prevents kinking and resultant damage thereto.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a heat exchange system having a reversible refrigeration cycle, a combination evaporator-condenser plate comprising a generally inverted U-shaped plate assembly including a pair of spaced panels interconnected by a capillary passageway extending across the bight portion of the assembly, one of said panels being immersed in a solution to be cooled and the other of said panels being immersed in a solution to be heated, each panel having a plurality of vertically spaced heat exchange sections with the uppermost sections being interconnected by said capillary passageway, the lowermost sections being connected to a reversible compressor unit, the bottom of each lower section being connected to the top of the adjacent upper section whereby condensed refrigerant received from the capillary passageway will have the greatest cooling effect in the uppermost section of said one panel and progressively decrease in cooling capacity as it approaches the bottom thereof thereby inducing convection currents in the solution being cooled for stirring the solution.

2. The combination of claim 1 wherein each of said sections is in the form of a transversely extending passage arrangement with the vertical tubular passageway being connected to each lower section with a vertical tubular passageway being remote from the capillary passageway, said capillary passageway extending across the bight portion of the assembly and including a plurality of passages in parallel relation to the vertical passageway.

3. The combination of claim 1 wherein one of said panels includes a vertically and horizontally disposed passageway exteriorly of the sections and the capillary passageway, a capillary passageway connected to the upper end of the vertical passageway, and absorbent material disposed in the vertical and horizontal passageways for saturation by a neutral vaporizable liquid for responding to the temperature of the solution in which the plate is immersed.

4. The combination of claim 3 wherein each of said panels are provided with a plurality of apertures inwardly of the vertical and horizontal passages for preventing conduction of heat from the remainder of the plate to the heat sensing material in the heat sensing bulb formed by the vertical and horizontal passages.

5. A heat exchange system comprising a first heat exchange plate, a second heat exchange plate, a fluid conduit connected to each of said plates, pump means connected to said conduits for pumping fluid from said one plate to said second plate, a capillary passageway interconnecting the plates remote from the conduits for completing a circuit for the flow of heat exchange fluid, each of said plates including an enlarged rectangular member having a plurality of spaced transverse passages forming heat exchange segments, the conduits being connected to the lowermost segment with the bottom of the lower segments being communicated with the top of the next adjacent upper segment, said capillary passageway being connected to the bottom of the uppermost segment whereby the temperature differential between the heat exchange fluid and medium surrounding the plates progressively varies in direct ratio to the vertical movement of the fluid in the segments.

6. The combination of claim 5 wherein said plates are arranged remotely, said capillary passageway having a portion thereof in the form of a built in passage in each plate, said conduits being flexible with a portion of the capillary passageway being disposed concentrically therein, and said pump means being reversible whereby the plates may alternately be employed as a condenser plate or an evaporator plate.

7. The combination of claim 5 wherein said plates are interconnected by a bight portion at the upper edge thereby forming an inverted U-shaped assembly, said capillary passageway including a plurality of side-by-side passageways, said bight portion including a curved passage interconnecting the portions of the capillary passageways disposed in the plates.

8. A heat exchange system comprising a first heat exchange plate, a second heat exchange, a fluid conduit connected to each of said plates, pump means connected to said conduits for pumping fluid from said one plate to said second plate, a capillary passageway interconnecting the plates remote from the conduits for completing a circuit for the flow of heat exchange fluid, each of said plates including an enlarged rectangular member having a plurality of spaced transverse passages forming heat exchange segments, the conduits being connected to the lowermost segment with the bottom of the lower segments being communicated with the top of the next adjacent upper segment, said capillary passageway being connected to the bottom of the uppermost segment whereby the temperature differential between the heat exchange fluid and medium surrounding the plates progressively varies in direct ratio to the vertical movement of the fluid in the segments one of said plates being provided with an elongated passageway forming a heat bulb adjacent two edges thereof, absorbent material packed in said passageway, said material being saturated throughout its length with a vaporizable and condensible liquid whereby immersion of the plate into a solution will render the increase or decrease in pressure caused by vaporization or condensation responsive to a mean temperature due to the sensitivity of the heat bulb throughout the height of the plate.

9. A heat bulb for responding to a mean temperature of a solution having temperature stratification comprising an elongated tubular member, a capillary tube connected to said member for connection to a pressure responsive gauge, said tubular member being filled with absorbent material, said material being saturated with a condensible liquid whereby unvaporized liquid will be disposed in contact with the tubular member substantially throughout its lengths for vaporizing the liquid in response to the temperature throughout the area of the tubular member, said capillary tube extending into the absorbent material for preventing entry of droplets of liquid into the capillary tube.

References Cited in the file of this patent
UNITED STATES PATENTS

| | | |
|---|---|---|
| 1,985,733 | Koester | Dec. 25, 1934 |
| 2,297,219 | Hintze et al. | Sept. 29, 1942 |
| 2,363,451 | Stockstrom | Nov. 21, 1944 |
| 2,441,270 | Hoesel | May 11, 1948 |
| 2,496,558 | Phillip | Feb. 7, 1950 |
| 2,639,189 | Bragg et al. | May 19, 1953 |
| 2,750,762 | Coyne | June 19, 1956 |
| 2,777,300 | Palmer | Jan. 15, 1957 |
| 2,787,130 | Kaufman | Apr. 2, 1957 |
| 2,804,773 | Domingo et al. | Sept. 3, 1957 |
| 2,848,200 | Jacobs | Aug. 19, 1958 |